UNITED STATES PATENT OFFICE.

ARTHUR WEINBERG, OF FRANKFORT-ON-THE-MAIN, GERMANY, ASSIGNOR TO LEOPOLD CASSELLA & CO., OF SAME PLACE.

MANUFACTURE OF BLUE DYE.

SPECIFICATION forming part of Letters Patent No. 472,091, dated April 5, 1892.

Application filed September 24, 1891. Serial No. 406,714. (Specimens.)

*To all whom it may concern:*

Be it known that I, ARTHUR WEINBERG, doctor of philosophy, a citizen of Prussia, and a resident of Frankfort-on-the-Main, Germany, have invented a new and useful Improvement in the Manufacture of Blue Dye-Stuffs, of which the following is a specification.

This invention relates to the manufacture of blue dye-stuffs belonging to the class of the diamido-triphenylcarbinols, from which hitherto, as it is known, only green or bluish-green coloring-matters have been obtained. The new dye-stuffs are distinguished by their great intensity, their pure blue shades, and their fastness. They are derivatives of the secondary ortho-toluidine (monomethyltoluidine, monoethyltoluidine.) These bases are condensed with metaoxybenzaldehyde. The resulting products are sulphonated and oxydized.

The following example shows how this invention may be practically executed: A mixture of twelve kilos of monoethylorthotoluidine, nine kilos of muriatic acid, (21° Baumé,) five kilos of metaoxybenzaldehyde is heated during about three days in a boiling-water bath. The melt is neutralized with carbonate of soda, and the oil which has not been condensed is distilled off with steam. The leuco base is filtered, washed, and dried. The diethyldiamidoditolyloxyphenylmethane is thus obtained in form of a nearly-colorless crystalline mass. It is easily soluble in caustic soda and also in diluted mineral acids. Its melting-point is 153° centigrade. The powdered base is introduced into sixty kilos of strong sulphuric acid. (Monohydrate.) It is heated to about 100° centigrade until a sample dissolved in water shows no longer any precipitate when treated with an excess of acetate of sodium. When this operation, which generally requires from four to six hours, is terminated, the mixture is diluted with water and ice and is neutralized with hydrate of lime. The leuco sulphonic acid in the filtered solution is oxidized by means of nine and one-half kilos peroxide of lead and twenty kilos of acetic acid. The blue coloring-matter will immediately be formed. The lead is removed by addition of sulphate of soda. From the filtered solution the coloring-matter is precipitated with common salt. It dyes wool and silk a very pure blue.

What I claim as new, and desire to secure by Letters Patent, is—

1. The process of preparing blue dyes, which consists in heating a mixture of monoalkylated ortho-toluidine with metaoxybenzaldehyde in presence of a condensing agent, such as hydrogen chloride, treating the thus-obtained product with strong sulphuric acid until the aqueous solution of a sample is no longer precipitated by acetate of sodium, and oxidizing the leuco sulpho-acids by means of an alkali bichromate, or of peroxides, such as lead peroxide, substantially as described.

2. The new blue coloring-matter having the constitution:

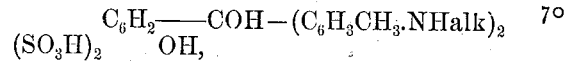

which is a dark-blue powder easily soluble in water, difficultly soluble in spirit, the blue aqueous solution not altered by addition of carbonate of soda, but if this solution is strongly acidulated the color turns into yellow, and reducing agents transform the color into a leuco compound.

In testimony that I claim the foregoing as my invention I have signed my name, in presence of two witnesses, this 11th day of September, 1891.

ARTHUR WEINBERG.

Witnesses:
ALVESTO S. HOGUE,
FRANK H. MASON.